United States Patent
Woo et al.

(10) Patent No.: US 9,242,158 B2
(45) Date of Patent: Jan. 26, 2016

(54) VIRTUAL GOLF SIMULATION APPARATUS AND METHOD

(75) Inventors: Chang Heon Woo, Yongin-si (KR); Hyung Wook Jang, Daejeon (KR); Heung Ryul Zo, Daejeon (KR)

(73) Assignee: GOLFZON CO., LTD., Daejeon (KR)

( * ) Notice: Subject to any disclaimer, the term of this patent is extended or adjusted under 35 U.S.C. 154(b) by 70 days.

(21) Appl. No.: 13/984,039

(22) PCT Filed: Feb. 9, 2012

(86) PCT No.: PCT/KR2012/000954
§ 371 (c)(1),
(2), (4) Date: Aug. 7, 2013

(87) PCT Pub. No.: WO2012/108699
PCT Pub. Date: Aug. 16, 2012

(65) Prior Publication Data
US 2013/0316839 A1  Nov. 28, 2013

(30) Foreign Application Priority Data
Feb. 11, 2011  (KR) .................. 10-2011-0012297

(51) Int. Cl.
*A63B 67/02* (2006.01)
*A63F 13/20* (2014.01)
*G09B 19/00* (2006.01)
*A63B 69/00* (2006.01)
*A63B 69/36* (2006.01)

(52) U.S. Cl.
CPC ............... *A63B 67/02* (2013.01); *A63F 13/06* (2013.01); *G09B 19/0038* (2013.01); *A63B 69/00* (2013.01); *A63B 69/3623* (2013.01); *A63B 2220/70* (2013.01); *A63F 2300/1093* (2013.01); *A63F 2300/6045* (2013.01); *A63F 2300/646* (2013.01); *A63F 2300/8011* (2013.01)

(58) Field of Classification Search
None
See application file for complete search history.

(56) References Cited

U.S. PATENT DOCUMENTS

| | | | |
|---|---|---|---|
| 5,221,082 A * | 6/1993 | Curshod | 473/199 |
| 5,342,054 A | 8/1994 | Chang et al. | |
| 2007/0196800 A1 | 8/2007 | Douthit et al. | |
| 2007/0238539 A1* | 10/2007 | Dawe et al. | 473/131 |
| 2008/0039222 A1* | 2/2008 | Kiraly | 473/131 |
| 2009/0042627 A1* | 2/2009 | Nicora | 463/2 |
| 2010/0151957 A1 | 6/2010 | Hohla et al. | |
| 2011/0292203 A1 | 12/2011 | Kim et al. | |

FOREIGN PATENT DOCUMENTS

| | | |
|---|---|---|
| KR | 10-2008-0106904 A | 12/2008 |
| KR | 10-0871595 B1 | 12/2008 |
| KR | 10-0937922 B1 | 1/2010 |

* cited by examiner

*Primary Examiner* — Jason Yen
(74) *Attorney, Agent, or Firm* — Revolution IP, PLLC

(57) ABSTRACT

A virtual golf simulation apparatus and method are provided. A sensing device senses hitting a ball by a user with a golf club and a ball trajectory is simulated in a virtual golf course according to sensing results, allowing the user to enjoy a virtual golf on a virtual golf course to provide the same sense of realism as when playing golf on a real golf course.

16 Claims, 4 Drawing Sheets

Ball trajectory simulation image calculated according to primarily transmitted 1st ball information
(a)

Ball trajectory simulation image calculated according to secondarily transmitted 2nd ball information
(b)

Ball trajectory simulation image according to 1st ball information and 2nd ball information
(c)

(a) Ball trajectory simulation image calculated according to primarily transmitted 1st ball information (b) Ball trajectory simulation image calculated according to secondarily transmitted 2nd ball information (c) Ball trajectory simulation image according to 1st ball information and 2nd ball information

| Ball trajectory simulation image calculated according to primarily transmitted 1st ball information | Ball trajectory simulation image calculated according to secondarily transmitted 2nd ball information | Ball trajectory simulation image according to 1st ball information and 2nd ball information |

(a)                 (b)                 (c)

VIRTUAL GOLF SIMULATION APPARATUS AND METHOD

CROSS REFERENCE TO PRIOR APPLICATIONS

This application is a National Stage Application of PCT International Patent Application No. PCT/KR2012/000954 filed on Feb. 9, 2012, under 35 U.S.C. §371, which claims priority to Korean Patent Application No. 10-2011-0012297 filed on Feb. 11, 2011, which are all hereby incorporated by reference in their entirety.

TECHNICAL FIELD

The present invention relates to a virtual golf simulation apparatus and method, and more particularly to a virtual golf simulation apparatus and method wherein a virtual golf course is visualized and simulated and a trajectory of a golf ball struck directly by a user is simulated in the virtual golf course.

BACKGROUND ART

With recent increase in the popularity of golf, a so-called screen golf system has been introduced which allows users to practice golf and enjoy virtual golf games using a virtual golf simulation apparatus and the like. Basically, when a user hits a golf ball placed on a golf mat by swinging a golf club, the virtual golf simulation apparatus senses the golf ball through a sensing device to extract physical characteristics of the moving golf ball and implements an image simulating the trajectory of the ball in a virtual golf course using the extracted physical characteristics.

When the sensing device is capable of calculating only basic physical characteristics of the moving ball among various physical characteristics, it is possible to quickly perform sensing processes to allow a simulation image of the trajectory of the ball to be implemented almost at the same time as when the ball is struck. However, in this case, there is a problem in that simulation accuracy is reduced since the trajectory of the ball cannot be accurately calculated using the basic physical characteristics only.

On the other hand, when the sensing device is capable of calculating various physical characteristics of the moving ball, simulation accuracy is increased. However, in this case, the time required to perform sensing processes is increased such that a simulation image of the trajectory of the ball is implemented after the required time elapses after the user hits the ball. This significantly reduces the realism of virtual golf, thereby greatly reducing the user's interest in the virtual golf.

DISCLOSURE OF INVENTION

Technical Problem

Therefore, the present invention has been made in view of the above problems, and it is an object of the present invention to provide a virtual golf simulation apparatus and method, wherein a sensing device senses hitting a ball by a user with a golf club and a ball trajectory is simulated in a virtual golf course according to sensing results, allowing the user to enjoy a virtual golf on a virtual golf course to provide the same sense of realism that a golfer would feel when playing golf on a real golf course, and wherein, while it takes a lot of time to perform the sensing processes as the sensing device accurately senses physical characteristics of a moving ball, it is possible to achieve rapid implementation of a simulation image of a ball trajectory according to sensing results to reduce the difference between the time at which a ball is struck by the user and the time at which a ball trajectory starts to be implemented in the simulation image to a level that cannot be perceived by humans, thereby greatly improving the realism of virtual golf.

Solution to Problem

In accordance with an aspect of the present invention, the above and other objects can be accomplished by the provision of a virtual golf simulation apparatus including a camera unit that acquires a plurality of images from hitting a ball by a user's swing, a sensing processing unit that analyzes first ball information for calculating physical characteristics of the moving ball hit by the user from the acquired image, and analyzes second ball information having at least one physical characteristic different from the first ball information independently of each other, and an image implementation means that starts implementing a simulation image of a trajectory of the ball based on the first ball information, and continues to implement the simulation image by applying the second ball information to the trajectory of the ball.

Preferably, the image implementation means receives the first ball information that has been primarily transmitted and starts implementing a simulation image of a trajectory of the ball based on the received first ball information, and receives the second ball information that has been secondarily transmitted and continues to implement the simulation image by applying the received second ball information to the trajectory of the ball.

Preferably, the first ball information includes at least one of a speed, a direction, and a vertical angle of the moving ball and the second ball information includes at least one of a speed, a direction, a vertical angle, and a spin of the moving ball.

Preferably, the second ball information includes spin information, and wherein the sensing processing unit estimates a spin of the ball to analyze the second ball information by extracting and analyzing an image of a golf club, with which the ball has been hit, from the acquired image.

Preferably, the sensing processing unit includes a first ball processing module that extracts a ball image from the acquired image and analyzes the first ball information, and a second ball processing module that extracts a club image from the acquired image and analyzes the second ball information.

Preferably, the sensing processing unit includes a first ball processing module that extracts a ball image from the acquired image and analyzes the first ball information; and a second ball processing module that estimates a spin of the ball to analyze the second ball information by extracting a ball image from the acquired image and analyzing changes of a predetermined mark or dimples on the ball image.

In accordance with another aspect of the present invention, there is provided a virtual golf simulation apparatus including a camera unit that acquires a plurality of images from hitting a ball by a user's swing, a sensing processing unit that performs image processing for calculating physical characteristics of the moving ball hit by the user from the acquired images, and processes and calculates each physical characteristic of the moving ball independently of each other in a distributed manner, and an image implementation means that starts implementing a simulation image of a trajectory of the ball based on at least one physical characteristic that has been first calculated and continues to implement the simulation image by applying a subsequently calculated at least one physical characteristic of the ball to the trajectory of the ball.

In accordance with another aspect of the present invention, there is provided a virtual golf simulation method including acquiring a plurality of images from hitting a ball by a user's swing, analyzing first ball information for calculating physical characteristics of the moving ball hit by the user from the acquired image, and analyzing second ball information having at least one physical characteristic different from the first ball information independently of each other, primarily transmitting the first ball information to an image implementation means to start implementing a simulation image of a trajectory of the ball, and secondarily transmitting the second ball information to the image implementation means and allowing the image implementation means to continue to implement the simulation image by applying the second ball information to the trajectory of the ball.

Preferably, analyzing the first ball information includes extracting and analyzing a ball image from the acquired image to extract at least one of a speed, a direction, and a vertical angle of the moving ball.

Preferably, analyzing the second ball information includes extracting and analyzing a club image from the acquired image to extract a spin of the moving ball.

In accordance with another aspect of the present invention, there is provided a virtual golf simulation method including sensing hitting a ball by a user's swing, and processing and calculating each physical characteristic of the moving ball hit by the user independently of each other in a distributed manner, receiving a first calculated physical characteristic value among the physical characteristics of the moving ball and starting implementation of a simulation image of a trajectory of the ball based on the first calculated physical characteristic value, and additionally receiving a subsequently calculated physical characteristic value among the physical characteristics of the moving ball and continuing to implement a simulation image by applying the subsequently calculated physical characteristic value to the simulation image which has started to be implemented.

Advantageous Effects of Invention

In the virtual golf simulation apparatus and method according to present invention, the sensing device efficiently performs sensing processes in a distributed manner although it takes a lot of time to perform the sensing processes as the sensing device accurately senses physical characteristics of a moving ball, thereby achieving rapid implementation of a simulation image of a ball trajectory according to sensing results. This reduces the difference between the time at which a ball is struck by the user and the time at which a ball trajectory starts to be implemented in the simulation image to a level that cannot be perceived by humans, thereby greatly improving the realism of virtual golf.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Embodiments of a virtual golf simulation apparatus and method according to the present invention will now be described in more detail with reference to the drawings.

First, a virtual golf simulation apparatus according to an embodiment of the present invention is described below with reference to FIGS. 1 and 2.

Figure 1:
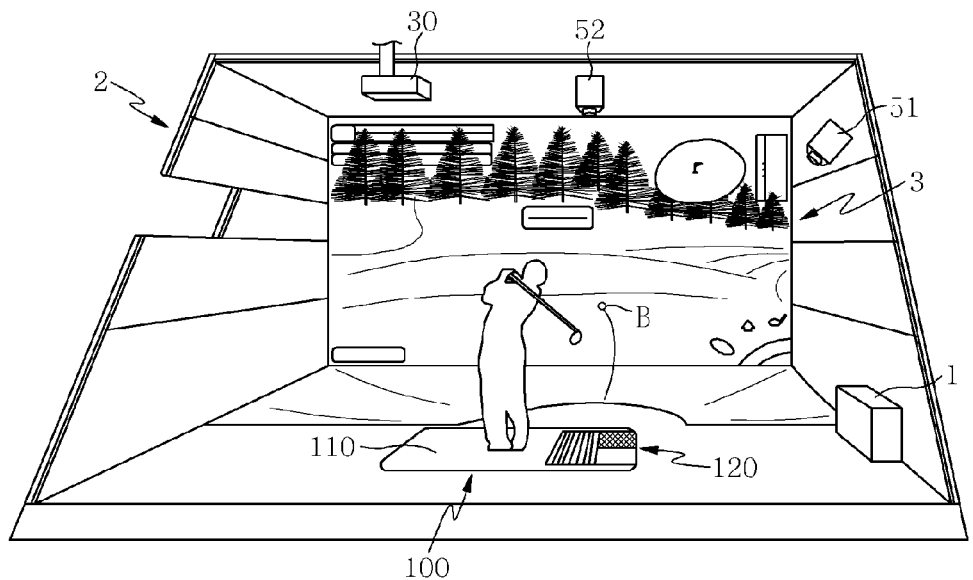
FIG. 1 illustrates an example of a screen golf system to which a virtual golf simulation apparatus according to an embodiment of the present invention is applied.
Figure 2:
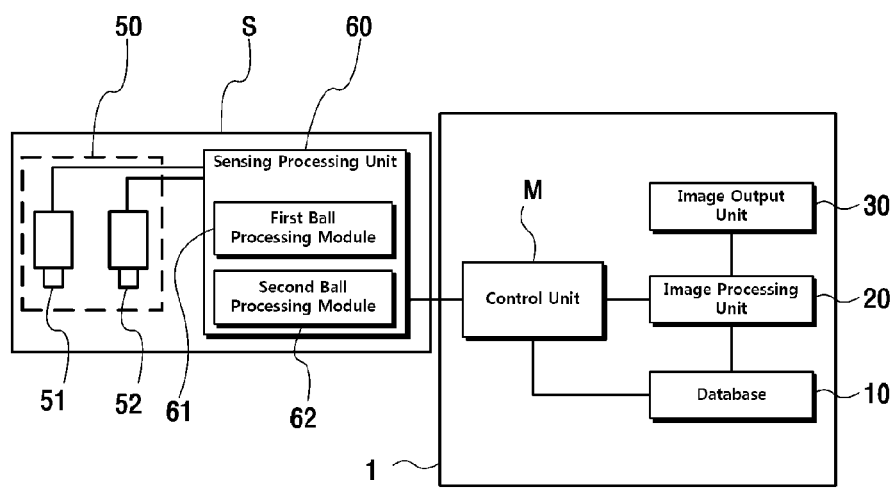
FIG. 2 is a block diagram illustrating a configuration of the virtual golf simulation apparatus according to an embodiment of the present invention.

FIG. 1 illustrates an example of a screen golf system to which the virtual golf simulation apparatus according to the embodiment of the present invention is applied and FIG. 2 is a block diagram illustrating a configuration of the virtual golf simulation apparatus that is applied to the screen golf system shown in FIG. 1.

As shown in FIGS. 1 and 2, the virtual golf simulation apparatus according to the embodiment of the present invention includes a sensing device S that senses hitting a ball B by a user and a simulator 1 that implements an image of a virtual golf course and provides a simulation image of the trajectory of the ball in the virtual golf course according to the result of sensing by the sensing device S to perform virtual golf simulation.

As shown in FIG. 1, in the screen golf system to which the virtual golf simulation apparatus according to the embodiment of the present invention is applied, a swing plate 100 is provided at the bottom of a golf box 2, which provides a space of a specific size, such that the user can practice their golf swing on the golf box 2, and a golf mat 120 is provided at one portion of the swing plate 100 to allow the user on the swing plate 100 to hit a ball B placed at the golf mat 120 with a golf swing. In addition, a screen 3 is provided at the front side such that an image output device, which has received image information from the simulator 1, projects a virtual golf simulation image onto the screen 3. Here, the image output device is, for example, an image output unit 30 shown in FIG. 2 such as a beam projector.

The swing plate 100 and the golf mat 120 may be provided on the bottom surface of the golf box 2 and may also be provided on the swing plate 100 as shown in FIG. 1.

The swing plate 100 may be provided so as to be inclined to the front, rear, left, and right at a certain angle and may be connected to the simulator 1 to form an inclination with respect to the topography of the currently implemented virtual golf course.

The sensing device S is provided in the golf box 2 to sense hitting the ball B by the user. In the example of FIG. 1, a sensing device that uses an image sensing scheme is provided as the sensing device S.

Specifically, the virtual golf simulation apparatus according to an embodiment of the present invention may include an image sensing type sensing device S which includes a camera unit 50 and a sensing processing unit 60 as shown in FIG. 2.

The camera unit 50 may include one camera or may include two or more cameras. To acquire an image of a moving ball B to extract 3-dimensional coordinates of the ball, the camera unit 50 preferably includes two or more cameras 51 and 52 to constitute a stereo camera as shown in FIG. 1.

Although the sensing device of the virtual golf simulation apparatus according to the embodiment of the present invention illustrated in FIGS. 1 and 2 is an image sensing type sensing device that uses cameras, the sensing device is not limited to the image sensing type and may include any type of sensing device which senses hitting a ball by a user to extract physical characteristics of a moving ball through information processing. The following is a description of an image sensing type sensing device that acquires an image of hitting the ball by the user to extract physical characteristics of the moving ball through information processing.

As shown in FIG. 2, the sensing device S may include a camera unit 50 including a plurality of cameras 51 and 52 and a sensing processing unit 60 that processes the image acquired by the camera unit 50 to extract physical characteristics of the moving ball.

Here, the physical characteristics of the moving ball may include a launch speed of the ball, the moving direction (horizontal launch angle) of the ball, the vertical launch angle of the ball, a spin applied to the ball, and the like.

The sensing processing unit 60 may include a first ball processing module 61 which extracts and analyzes a ball image from a source image acquired through the camera unit 50 to analyze first ball information for calculating physical characteristics of the moving ball and a second ball processing module 62 which processes and analyzes the source image or the image used in the first ball processing module 61 to analyze second ball information.

A moving ball basically has various physical characteristics. Therefore, when the various physical characteristics are collectively processed, it takes a lot of time to perform simulation. To rapidly perform simulation, the sensing device of the virtual golf simulation apparatus according to the present invention processes the various physical characteristics of the moving ball through the first ball processing module and the second ball processing module in a distributed manner.

Accordingly, it is preferable that the first ball processing module 61 and the second ball processing module 62 of the sensing processing unit 60 process and analyze different physical characteristics of the ball independently of each other.

That is, it is preferable that each of the first ball information analyzed by the first ball processing module 61 and the second ball information analyzed by the second ball processing module 62 include at least one different physical characteristic and the first ball information and the second ball information be processed and analyzed independently of each other.

Here, the first ball information may include physical characteristics such as, for example, the speed, the direction, and the vertical angle of the ball and the second ball information may include a physical characteristic such as, for example, the spin of the ball.

The simulator 1 included in the virtual golf simulation apparatus according to an embodiment of the present invention preferably includes a control unit M, a database 10, an image processing unit 20, and an image output unit 30.

The database 10 stores all data required for virtual golf simulation. For example, the database 10 stores data required to drive the system, data associated with implementation of an image of a virtual golf course, and data associated with implementation of a simulation image of the trajectory of the ball.

The image processing unit 20 performs image processing for implementing an image of a virtual golf course, a simulation image of the trajectory of a ball in the virtual golf course, or the like.

The image output unit 30 outputs image information received from the image processing unit 20 to the screen to allow the user to view the corresponding image.

The control unit M receives information associated with sensing results from the sensing device S and controls operation of all components such as the database 10, the image processing unit 20, and the image output unit 30. That is, the control unit M and the components such as the database 10 and the image processing unit 20 function as an image implementation means for implementing a simulation image of the trajectory of the ball according to the sensing results from the sensing device S.

While processing the physical characteristics of the moving ball in a distributed manner, the sensing device S of the virtual golf simulation apparatus according to an embodiment of the present invention transmits a physical characteristic that has been first calculated among the physical characteristics to the image implementation means, i.e., the simulator 1, to start implementation of a simulation image of the trajectory of the ball and transmits next calculated information to the simulator 1 to apply the next calculated information to the simulation image which has already started to be implemented. Thus, it is possible to quickly implement a simulation image of an accurate ball trajectory although it takes a lot of time to accurately calculate the physical characteristics of the moving ball.

Here, it is preferable that the sensing device first calculate and transmit basic physical characteristics among various physical characteristics of the moving ball to the simulator and apply a physical characteristic, whose information processing takes a long time, after the simulation image starts to be implemented.

For example, it is preferable that the sensing device first calculate and transmit the speed, direction and vertical angle of the ball, which can be rapidly calculated among the physical characteristics of the ball, to the simulator and then transmit the spin of the ball whose information processing takes a longer time to the simulator immediately after the spin of the ball has been calculated, such that the transmitted ball spin is applied while implementation of the simulation image is in progress.

Although FIG. 2 illustrates an example in which the sensing device S including the camera unit 50 and the sensing processing unit 60 and the simulator 1 are provided independently of each other manner in the virtual golf simulation apparatus according to the present invention, the present invention is not limited to this example and may also be applied to an example in which the camera unit 50 and the sensing processing unit 60 are separated from each other, the sensing processing unit 60 is included in the simulator 1, and the camera unit 50 and the simulator 1 are provided independently of each other in the virtual golf simulation apparatus.

The control unit M and the sensing processing unit 60 in the simulator 1 may be provided independently of each other and the control unit M and the sensing processing unit 60 may also be integrated into a single control means.

The following Table 1 shows details of the first ball information and the second ball information.

TABLE 1

| First Ball Information | Second Ball Information |
| --- | --- |
| Information required to start simulation of ball trajectory | Information required to perform simulation of ball trajectory |
| At least one of ball speed, direction, and vertical angle | At least one of ball speed, direction, vertical angle, and spin |
| Ball image information extracted from first acquired image | Club image information extracted from first acquired image |
| Physical characteristic information first calculated among physical characteristics of ball | Information sequentially calculated after the first calculated information among physical characteristics of ball |

The first ball information and the second ball information described in Table 1 are described below in more detail with reference to various embodiments shown in FIGS. 4 and 5.

Figure 3:
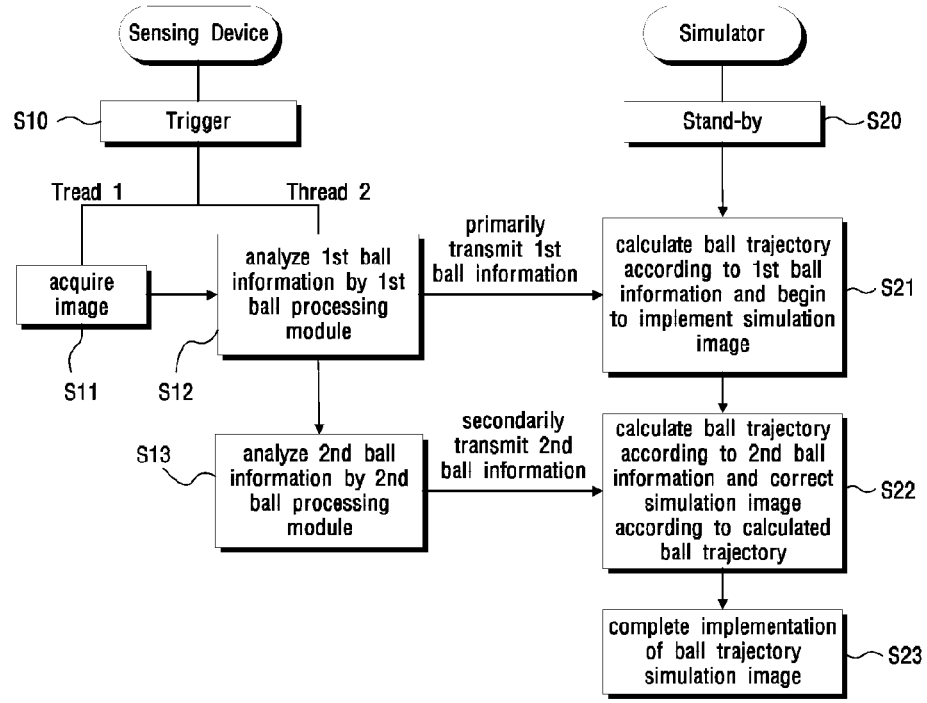
FIG. 3 is a flowchart of a virtual golf simulation method according to an embodiment of the present invention.
Figure 4:
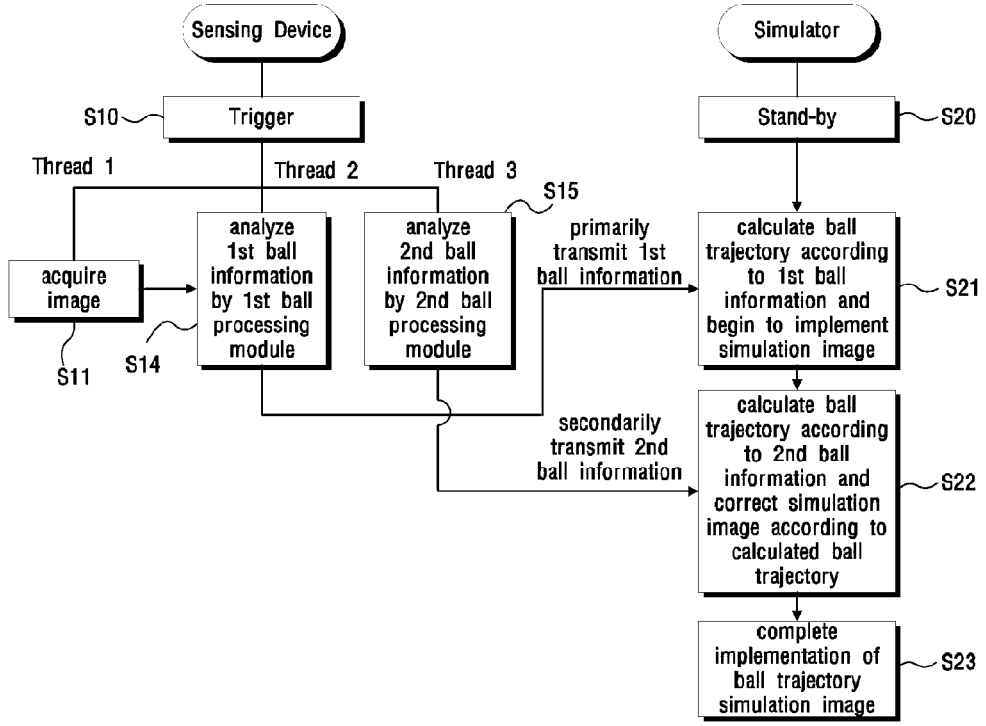
FIG. 4 and FIG. 5 are flowcharts of a virtual golf simulation method according to another embodiment of the present invention.
Figure 5:
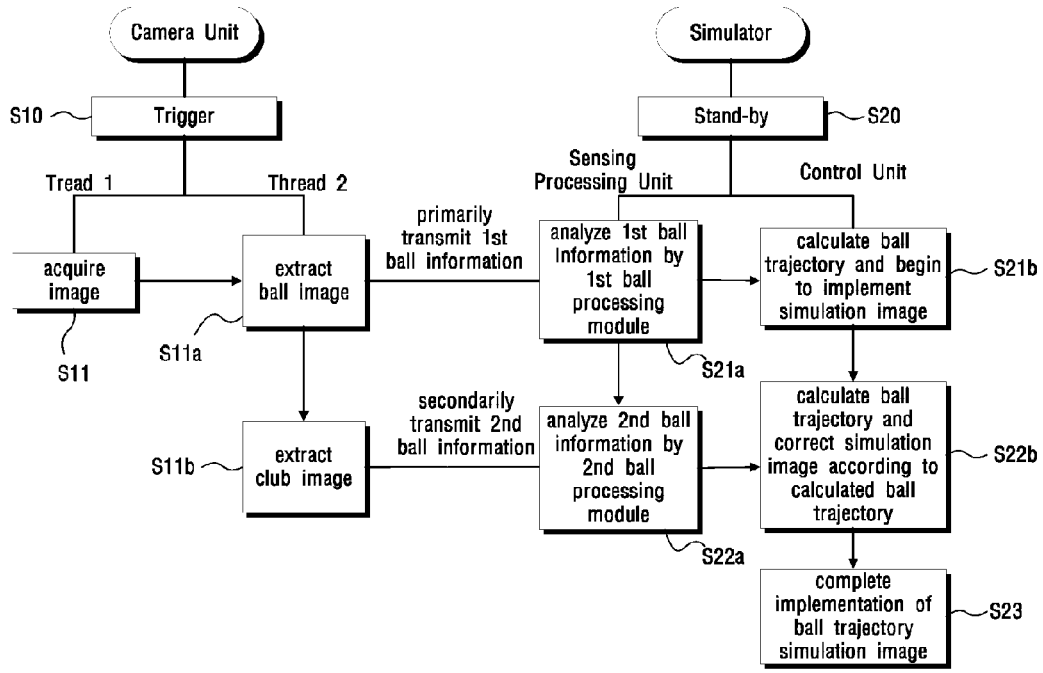

FIGS. 3 and 4 are flowcharts of operation of the sensing device and the simulator that are main components of the virtual golf simulation apparatus according to the present invention and FIG. 5 is a flowchart of operation of the camera unit and the simulator of the virtual golf simulation apparatus according to the present invention.

First, a virtual golf simulation method according to an embodiment of the present invention is described below with reference to FIG. 3.

As shown in FIG. 3, the virtual golf simulation method according to the present invention may be divided into a procedure performed by the sensing device and a procedure performed by the simulator.

When the user hits a ball, the sensing device senses the hitting and triggers a sensing procedure (S10). That is, when the user hits a ball, the sensing device starts a sensing procedure including acquiring an image and processing the acquired image.

Here, as shown in FIG. 3, the sensing device may simultaneously perform various processes in a multithreaded manner.

The image acquisition process S11, which is performed by the camera unit, may be performed through Thread 1 while the image processing and information analysis processes S12 and S13, which are performed by the first ball processing module and the second ball processing module of the sensing processing unit, may be performed through Thread 2.

Specifically, when the sensing device triggers a sensing procedure, the camera unit acquires an image and transmits the acquired image in real time to the first ball processing module of the sensing processing unit (S11).

The first ball processing module extracts and processes a ball image from the image received from the camera unit to analyze and extract first ball information such as the speed, direction, vertical angle, and the like of the ball among the physical characteristics of the moving ball (S12).

When the first ball processing module has extracted the first ball information, the sensing device immediately transmits the extracted first ball information to the simulator (primary transmission). While the sensing device is performing a sensing process, the simulator is in a standby mode after completing the preparation for simulation image implementation (S20) and, upon receiving the first ball information that has been primarily transmitted, the simulator calculates a ball trajectory according to the received first ball information and starts implementing a simulation image based on the calculated ball trajectory (S21).

When the first ball processing module in the sensing device primarily transmits the first ball information to the simulator since the first ball processing module completes the first ball information analysis, the second ball processing module starts analyzing second ball information such as the spin of the ball (S13).

When the second ball processing module has completed extracting the second ball information, the sensing device secondarily transmits the second ball information to the simulator. The simulator calculates the trajectory of the ball according to the second ball information and corrects a ball trajectory image in the simulation image, which has already started to be implemented, according to the calculated ball trajectory (S22) to perform accurate simulation (S23).

Here, the process of extracting the speed, direction, and vertical angle of the ball by the first ball processing module may be performed every some milliseconds and the process of completing processing by the second ball processing module after completion of processing by the first ball processing module may also be performed every some milliseconds. Therefore, an accurate simulation image can be implemented, which has been secondarily transmitted, based on the second ball information in less than 1 second after a simulation image is implemented based on the first ball information that has been primarily transmitted. Therefore, it is possible to rapidly implement an accurate simulation image.

For example, it may take about 100 ms for the first ball processing module to extract a ball image from an acquired source image, process the extracted ball image, and calculate the speed, direction, and vertical angle of the ball and it may take about 200 ms for the second ball processing module to delete the ball image from the source image, extract a club image, and analyze a trajectory of the club head to estimate the spin of the ball.

The method, in which ball information analysis by the first ball processing module and ball information analysis by the second ball processing module are performed in the same thread as described above in this embodiment, can be applied to the case in which the second ball processing module performs image processing according to the result of processing by the first ball processing module.

In the above example, the acquired source image may include a ball image, a club image, and a noise image which cannot be identified as a ball or club image. Here, the first ball processing module can accurately locate and analyze a ball image. Since it is possible to identify a ball image in the source image according to the result of processing by the first ball processing module, the second ball processing module can extract and analyze only a club image from the source image by deleting the ball image identified by the first ball processing module.

When the sensing device primarily transmits the first ball information and secondarily transmits the second ball information, the second ball information preferably includes the first ball information. That is, when the first ball information includes the speed, direction, and vertical angle of the ball and the second ball information includes the spin of the ball, the second ball information preferably includes all of the speed, direction, vertical angle, and spin of the ball.

When the second ball processing module has failed to extract the spin of the ball (for example, when the second ball processing module cannot estimate the spin since the speed of the ball is too low as when putting), the second ball information which is secondarily transmitted may include only the speed, direction, and vertical angle of the ball.

As described above, the sensing device of the virtual golf simulation apparatus according to the present invention first analyzes first ball information such as the speed, direction, and vertical angle among the physical characteristics of the moving ball and applies the analyzed result to a simulation image and analyzes second ball information such as the spin of the ball within a very short time thereafter and applies the analyzed result to the simulation image. Therefore, it is possible to quickly and accurately implement a simulation image.

In an embodiment illustrated in FIG. 4, a process for acquiring an image (S11), a process for analyzing ball information by the first ball processing module (S14), and a process for analyzing ball information by the second ball processing module (S15) are separately performed through Thread 1, Thread 2, and Thread 3.

That is, ball information analysis by the first ball processing module and ball information analysis by the second ball processing module are simultaneously performed through different threads.

In this case, a result of ball information analysis, which is first obtained from among a result of ball information analysis by the first ball processing module and a result of ball information analysis by the second ball processing module, is primarily transmitted to the simulator and a next analysis result is secondarily transmitted to the simulator. In the case in which the first ball processing module analyzes first ball information such as the speed, direction, and vertical angle of the ball and the second ball processing module analyzes second ball information such as the spin of the ball, typically, the first ball information analyzed by the ball processing module is primarily transmitted to the simulator and the second ball information analyzed by the ball processing module is secondarily transmitted to the simulator since it takes a longer time to analyze the spin of the ball.

In this embodiment, the second ball processing module may analyze ball information by extracting and analyzing a club image from a source image and estimating a spin of the ball. However, this embodiment may be more suitable for the case in which the second ball processing module extracts a spin of the ball by analyzing a ball image rather than by analyzing a movement trajectory of the club.

For example, the second ball processing module may extract a spin of the ball by analyzing changes of dimples of the ball in the source image and may also extract a spin of the ball by analyzing changes of a predetermined marking on the ball in a ball image in the source image. Here, the term "dimples" refers to crater-shaped depressions in the surface of a golf ball. Dimples allow the golf ball to more travel a greater distance than balls with a smooth surface.

Accordingly, in the case in which both the first ball processing module and the second ball processing module extract and analyze a ball image from a source image, it is possible to obtain a much faster analysis result by simultaneously performing ball information analysis by the first ball processing module and ball information analysis by the second ball processing module through different threads.

Also, in this embodiment, when the sensing device primarily transmits the first ball information and secondarily transmits the second ball information, the second ball information preferably includes the first ball information. That is, when the first ball information includes the speed, direction, and vertical angle of the ball and the second ball information includes the spin of the ball, the second ball information preferably includes all of the speed, direction, vertical angle, and spin of the ball.

Although not explicitly illustrated in FIGS. 3 and 4, it is preferable that a trajectory of the ball not be calculated based only on sensing results when a simulation image is implemented but instead a simulation image be implemented also using weather information of the virtual golf course.

That is, in the case in which weather information received from a weather information server has been stored in the database or weather information arbitrarily set in the system has been stored in the database, it is preferable that the simulator apply the weather information stored in the database to the ball information received from the sensing device to obtain a more accurate and reliable simulation result.

In the embodiment shown in FIG. 5, the camera unit and the simulator are provided independently of each other. Here, the first ball information includes ball image information generated from a ball image extracted from an initially acquired image and the second ball information includes club image information or ball and club image information generated from a club image extracted from an initially acquired image.

That is, when a sensing procedure is triggered (S10), the camera unit acquires an image associated with a process of impact of the ball by the golf club (S11). Here, a process for extracting a ball image from the initially acquired image may be performed through a different thread (S11a) and a process for extracting a club image from the initially acquired image may be performed (S11b).

The first ball information including ball image information generated from a ball image extracted from the initially acquired image is primarily transmitted to the simulator and the second ball information including club image information is secondarily transmitted to the simulator.

Here, in the simulator, the first ball information and the second ball information transmitted from the camera unit may be processed through the sensing processing unit and processing results may be sequentially delivered to the control unit such that simulation starts and progresses as two processes. The simulator may also include a single control means that can perform functions of both the sensing processing unit and the control unit and perform ball information analysis and ball trajectory simulation through different threads. That is, the control means may perform processes, which are performed by the sensing processing unit in the example of FIG. 5, through Thread 1 and may perform processes, which are performed by the control unit in the example of FIG. 5, through Thread 2.

The first ball information primarily transmitted to the sensing processing unit is analyzed by the first ball processing module (S21a) and the analyzed result is delivered to the control unit. The control unit then calculates a ball trajectory based on the analyzed result and starts implementing a simulation image (S21b).

Then, when the second ball information is secondarily transmitted to the sensing processing unit, the second ball information is analyzed by the second ball processing module (S22a) and the analyzed result is delivered to the control unit. The control unit then calculates a ball trajectory based on the analyzed result and continues to implement a simulation image, which has already started to be implemented, while correcting the simulation image according to the calculated ball trajectory (S21b).

In this manner, the simulator may start implementing a simulation image based on the first ball information and continue to implement the simulation image based on the second ball information, thereby completing implementation of a ball trajectory simulation image (S23).

Figure 6:
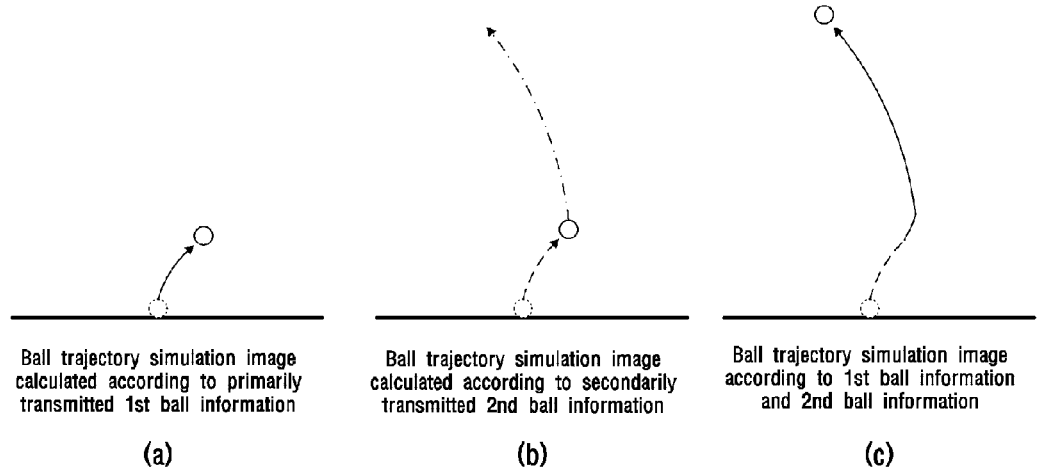
FIGS. 6 and 7 illustrate various methods for implementing a simulation image according to ball information items that are transmitted from a sensing device of a virtual golf simulation apparatus after being processed in a distributed manner by the sensing device according to the present invention.

Various methods, in which a simulation image of a ball trajectory is implemented when ball information items are separately transmitted from the sensing device after being processed in a distributed manner by the sensing device, are described below with reference to FIGS. 6 and 7.

FIG. 6(a) illustrates an example in which a ball trajectory is calculated according to first ball information that is primarily transmitted from the sensing device, FIG. 6(b) illustrates an example in which the ball trajectory is calculated according to second ball information that is secondarily transmitted from the sensing device, and FIG. 6(c) illustrates an example in which a simulation image of the ball trajectory, which has started to be implemented as shown in FIG. 6(a), continues to be implemented after being corrected according to the ball trajectory calculated according to the second ball information as shown in FIG. 6(b).

Specifically, a simulation image portion (see FIG. 6(a)) that has been implemented according to the first ball information that has been primarily transmitted to the simulator and a simulation image portion (see FIG. 6(b)) that is to be implemented according to both the first ball information and the second ball information that has been secondarily transmitted are combined to implement a simulation image of a final ball trajectory (see FIG. 6(c)).

Figure 7:
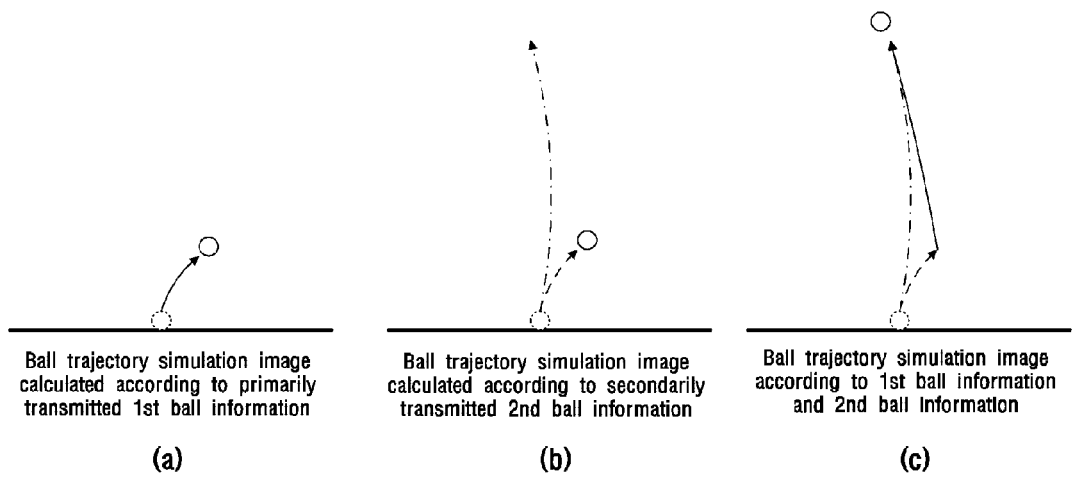

In an example shown in FIG. 7, a simulation image is implemented in a manner different from that described above. FIG. 7(a) illustrates an example in which a ball trajectory is calculated according to first ball information that is primarily transmitted from the sensing device, FIG. 7(b) illustrates an example in which a ball trajectory is recalculated from the beginning according to second ball information that is secondarily transmitted from the sensing device, and FIG. 7(c) illustrates an example in which a simulation image of a final ball trajectory is implemented by gradually matching a simulation image of the ball trajectory, which has started to be implemented as shown in FIG. 7(a), with the ball trajectory recalculated according to the second ball information as shown in FIG. 7(b).

Specifically, a simulation image of a ball trajectory starts to be implemented according to the first ball information that has been primarily transmitted to the simulator (see FIG. 7(a)), a ball trajectory is recalculated from the beginning according to the first ball information and the second ball information as the second ball information has been secondarily transmitted (see FIG. 7(b)), and a simulation image is implemented such that a ball, whose simulation image has already been implemented, gradually follows the recalculated ball trajectory (see FIG. 7(c)).

As described above, according to the present invention, the sensing device processes and calculates different physical characteristics independently of each other and sequentially transmits calculated results, starting from an initially calculated result, to the simulator and the simulator starts implementing a simulation image immediately upon receiving ball information and continues to implement the simulation image by applying sequentially received information to the simulation image. This method can quickly achieve a correct simulation result and reduces the difference between the time at which a ball is struck by the user and the time at which a ball trajectory starts to be implemented in the simulation image to a level that cannot be perceived by humans (for example, a level of milliseconds which is hardly perceived by humans), thereby greatly improving the realism of virtual golf.

Mode for the Invention

Various embodiments have been described in the best mode for carrying out the invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

In the virtual golf simulation apparatus and method according to present invention, the sensing device efficiently performs sensing processes in a distributed manner although it takes a lot of time to perform the sensing processes as the sensing device accurately senses physical characteristics of a moving ball, thereby achieving rapid implementation of a simulation image of a ball trajectory according to sensing results. This reduces the difference between the time at which a ball is struck by the user and the time at which a ball trajectory starts to be implemented in the simulation image to a level that cannot be perceived by humans, thereby greatly improving the realism of virtual golf. Therefore, the present invention can be widely used in industries associated with the virtual golf simulation apparatus and method.

The invention claimed is:

1. A virtual golf simulation apparatus comprising:
a golf box providing a space in which a user can practice their golf swing at the golf box, and a golf mat provided to allow the user to hit a ball placed on the golf mat;
a screen provided at a front side of the golf box to display simulation image of the trajectory of the moving ball according to a ball information;
at least one camera configured to acquire a plurality of images of a moving ball;
a sensing processing unit configured to calculate the plurality of images and extract physical characteristics of the moving ball, wherein the physical characteristics of the moving ball include a first ball-information and a second ball-information different from the first ball-information, wherein the sensing processing unit is configured to analyze the first ball-information and the second ball-information, the calculation of the moving ball being performed independently and continuously;
an image processor, executed by a controller, configured to implement an image of a virtual golf course and a simulation image of a trajectory of the moving ball in the virtual golf course and send signals to a display device to display the implemented image of the virtual golf course and the implemented simulation image of the trajectory of the moving ball, wherein
the controller is configured to receive the physical characteristics of the moving ball from the sensing processing unit and control the image processor based on the received physical characteristics, and
the controller is further configured to control the image processor to start implementing the simulation image of the trajectory of the moving ball based on the first ball-information primarily received from the sensing processing unit and continue to control the image processor to process the simulation image by applying the second ball-information secondarily received from the sensing processing unit to the trajectory of the moving ball, and to display the implemented simulation image of the first ball-information and the second ball-information to the screen.

2. The virtual golf simulation apparatus according to claim 1, wherein the first ball-information includes at least one of a speed, a direction, and a vertical angle of the moving ball and the second ball-information includes at least one of the speed, the direction, the vertical angle, and a spin of the moving ball.

3. The virtual golf simulation apparatus according to claim 1, wherein the second ball-information includes spin information, and wherein the sensing processing unit configured to estimate a spin of the moving ball to analyze the second ball-information by extracting and analyzing an image of a golf club, associated with a hit of the moving ball, from the acquired image.

4. The virtual golf simulation apparatus according to claim 1, wherein the sensing processing unit includes:
   a first processing module configured to extract a ball image from the acquired image and analyze the first ball-information; and
   a second processing module configured to extract a club image from the acquired image and analyze the second ball-information.

5. The virtual golf simulation apparatus according to claim 1, wherein the sensing processing unit includes:
   a first processing module configured to extract a ball image from the acquired image and analyze the first ball-information; and
   a second processing module configured to extract a spin of the moving ball to analyze the second ball-information by extracting a ball image from the acquired image and analyzing changes of a predetermined mark or dimples on the ball image.

6. The virtual golf simulation apparatus according to claim 1, further comprising a database configured to store weather information received from a weather information server or arbitrarily set weather information,
   wherein the controller is configured to control the image processor to process the simulation image of the trajectory by applying the weather information to the simulation image of the trajectory.

7. The virtual golf simulation apparatus according to claim 1, wherein the controller is configured to control the image processor to process the simulation image of the trajectory of the moving ball by:
   combining i) a first simulation image portion that has been implemented according to the first ball-information primarily received and ii) a second simulation image portion that is to be implemented from an end of the first simulation image portion according to both the first ball-information and the secondarily received second ball-information, as the second ball-information is applied.

8. The virtual golf simulation apparatus according to claim 1, wherein the controller is configured to control the image processor to
   start implementing a simulation image of a trajectory of the moving ball according to the first ball-information primarily received,
   calculate a trajectory of the moving ball from a beginning of the trajectory by using both the first ball-information and the second ball-information as the second ball-information has been secondarily received, and
   process the simulation image such that a remaining portion of the ball trajectory gradually matches the calculated trajectory of the moving ball.

9. A virtual golf simulation apparatus comprising:
   at least one camera configured to acquire a plurality of images of a moving ball;
   a sensing processing unit configured to process the plurality of images and extract physical characteristics of the moving ball, wherein the sensing processing unit is configured to calculate each of the physical characteristics of the moving ball, independently and continuously;
   an image processor configured to implement an image of a virtual golf course and a simulation image of a trajectory of the moving ball in the virtual golf course and send signals to a display device to display the implemented image of the virtual golf course and the implemented simulation image of the trajectory of the moving ball; and
   a controller configured to receive the physical characteristics of the moving ball from the sensing processing unit and control the image processor based on the received physical characteristics, wherein the controller is configured to control the image processor to start implementing the simulation image of the trajectory of the moving ball based on a firstly calculated physical characteristic and
   continue to control the image processor to process the simulation image by applying at least one subsequently calculated characteristic different from the firstly calculated characteristic to the trajectory of the moving ball.

10. The virtual golf simulation apparatus according to claim 9, wherein the controller is configured to control the image processor to start implementing the simulation image by applying the firstly calculated physical characteristic among a speed, a direction, a vertical angle, and a spin of the moving ball to the trajectory of the moving ball, and then apply the at least one subsequently calculated physical characteristic among the speed, the direction, the vertical angle, and the spin to the trajectory of the moving ball to correct the trajectory already started to be implemented.

11. A computer-implemented virtual golf simulation method comprising:
   acquiring by at least one camera a plurality of images of a moving ball;
   processing, by a sensing processing unit, the acquired plurality of images to extract physical characteristics of the moving ball, wherein the physical characteristics of the moving ball include a first ball-information and a second ball-information different from the first ball-information;
   analyzing the first ball-information of the moving ball and primarily transmitting the first ball-information to an image processor, by the sensing processing unit;
   upon detection of the primarily transmitting the first ball-information, analyzing the second ball-information of the moving ball and secondarily transmitting the second ball-information to the image processor, by the sensing processing unit;
   starting, by the image processor controlled by a controller, to calculate a simulation image of a trajectory of the moving ball based on the first ball-information primarily received;
   continue to calculate, by the image processor controlled by the controller, the simulation image by applying the second ball-information secondarily received to the trajectory of the moving ball; and
   sending, by the image processor, signals to a display device to display the simulation image of the trajectory of the moving ball.

12. The virtual golf simulation method according to claim 11, wherein the analyzing the first ball-information includes extracting and analyzing a ball image from the acquired image to extract at least one of a speed, a direction, and a vertical angle of the moving ball.

13. The virtual golf simulation method according to claim 11, wherein the analyzing the second ball-information includes extracting and analyzing an image of a club associated with a hit of the moving ball from the acquired image to extract a spin of the moving ball.

14. The virtual golf simulation method according to claim 11, further comprising:
  extracting weather information; and
  applying the extracted weather information to the trajectory of the moving ball.

15. The virtual golf simulation method according to claim 11, wherein the processing the simulation image includes:
  combining i) a first simulation image portion that has been implemented according to the first ball-information primarily received and ii) a second simulation image portion that is to be implemented from an end of the first simulation image portion according to both the first ball-information and the second ball-information, as the second ball-information is applied.

16. The virtual golf simulation method according to claim 11, wherein the processing the simulation image includes:
  calculating a first trajectory of the moving ball based on the first ball-information;
  calculating a second trajectory of the moving ball based on both the first ball-information and the second ball-information as the second ball-information is applied; and
  processing the simulation image such that a remaining portion of the first trajectory not implemented gradually matches the calculated second trajectory of the moving ball.

* * * * *